(12) United States Patent
Alber et al.

(10) Patent No.: US 8,948,928 B2
(45) Date of Patent: Feb. 3, 2015

(54) SUSTAINED OVER-THE-HORIZON VERTICAL TAKEOFF AND LANDING SENSING SYSTEM

(71) Applicant: Sikorsky Aircraft Corporation, Stratford, CT (US)

(72) Inventors: Mark R. Alber, Milford, CT (US); Timothy Fred Lauder, Oxford, CT (US); Jonathan Hartman, Cheshire, CT (US); Bryan Clark Holasek, North Andover, MA (US)

(73) Assignee: Sikorsky Aircraft Corporation, Stratford, CT (US)

( * ) Notice: Subject to any disclaimer, the term of this patent is extended or adjusted under 35 U.S.C. 154(b) by 21 days.

(21) Appl. No.: 13/866,489

(22) Filed: Apr. 19, 2013

(65) Prior Publication Data

US 2014/0316608 A1    Oct. 23, 2014

(51) Int. Cl.
| | | |
|---|---|---|
| *B64C 39/00* | (2006.01) | |
| *B64C 27/00* | (2006.01) | |
| *B64C 19/00* | (2006.01) | |
| *B64C 29/00* | (2006.01) | |
| *B64C 39/02* | (2006.01) | |
| *B64D 47/00* | (2006.01) | |

(52) U.S. Cl.
CPC ............... *B64C 19/00* (2013.01); *B64C 29/00* (2013.01); *B64C 39/022* (2013.01); *B64C 39/024* (2013.01); *B64D 47/00* (2013.01); *B64C 2201/042* (2013.01); *B64C 2201/148* (2013.01); *B64C 2201/024* (2013.01)
USPC ................. 701/2; 701/4; 244/17.11; 244/190

(58) Field of Classification Search
None
See application file for complete search history.

(56) References Cited

U.S. PATENT DOCUMENTS

| | | | | |
|---|---|---|---|---|
| 2,995,740 | A * | 8/1961 | Shreckengost | 342/58 |
| 3,149,803 | A * | 9/1964 | Petrides et al. | 244/17.13 |
| 6,422,506 | B1 * | 7/2002 | Colby | 244/1 TD |
| 7,149,611 | B2 * | 12/2006 | Beck et al. | 701/2 |
| 7,631,834 | B1 * | 12/2009 | Johnson et al. | 244/17.17 |
| 2007/0200027 | A1 * | 8/2007 | Johnson | 244/3.1 |
| 2011/0315810 | A1 * | 12/2011 | Petrov | 244/17.23 |

* cited by examiner

*Primary Examiner* — Michael J Zanelli
(74) *Attorney, Agent, or Firm* — Cantor Colburn LLP

(57) ABSTRACT

An electrically powered of the vertical takeoff and landing aircraft configured for use with a tether station having a continuous power source is provided including at least one rotor system. The vertical takeoff and landing aircraft additionally has an autonomous flight control system coupled to the continuous power source. The autonomous flight control system is configured to operate an electrical motor coupled to the at least one rotor system such that the vertical takeoff and landing aircraft continuously hovers above the tether station in a relative position. The vertical takeoff and landing aircraft also includes a detection system for detecting objects at a distance from the vertical takeoff and landing aircraft.

19 Claims, 3 Drawing Sheets

SUSTAINED OVER-THE-HORIZON VERTICAL TAKEOFF AND LANDING SENSING SYSTEM

BACKGROUND OF THE INVENTION

Exemplary embodiments of the invention relate to navigational and sensing systems, and more particularly, to an over the horizon sensor system for a ship or stationary ground base.

Radar, or radio detection and ranging, typically involves the transmission of electromagnetic energy through the atmosphere to an area of interest. The electromagnetic energy is reflected by objects in the area of interest and the reflections are analyzed to determine the object's type, range and direction. Two parameters of a radar system's performance that are of particular interest are the maximum range at which objects can be detected and the resolution that can be located and tracked once detected. Over the horizon radar systems commonly used on ships employ antennas and transceivers on masts to detect objects beyond the visual horizon. However, the sensing range and resolution of an over-the-horizon system are limited by the height of the system antenna.

Similar conditions exist when utilizing an EO, or electro-optical, sensing device to examine objects of interest over a distance, either on a ship or at a stationary, ground location. Instead of transmitting electromagnetic energy through the atmosphere to an area of interest, electro-optical sensors gather electromagnetic energy being transmitted from objects in the environment, analyzing these signals to determine an object's type, range and distance. The maximum range at which objects can be detected and the resolution they can be detected at are also parameter's of a electro-optical sensor's performance, limiting such sensors in most cases to investigation of line-of-sight areas. Ships and ground based systems often employ towers or masts to increase the sensing height of these electro-optical sensors, thus increasing their range of sensing.

A lighter-than-air device or rotary wing aircraft may be used to improve the sensing range of navigational and detection systems of a ship or ground-based sensing platforms. However, the range of the sensing system is only improved when the lighter-than-air device or vertical lift aircraft is at an altitude above the antenna of the ship or existing infrastructure or terrain features. Because conventional vertical lift aircraft have a limited fuel capacity, they may remain airborne for only a short period of time, such as a few hours for example. Therefore the improvement in the range of the navigational and detection systems is only temporary. Lighter-than-air devices may remain aloft for extended periods of time. However, lighter-than-air devices are made from relatively thin materials and therefore are more susceptible to wind and other weather effects which limit operation thereof. Consequently, lighter-than-air devices are more susceptible to failure and such failures are more commonly catastrophic.

Likewise, both lighter-than-air devices and conventional vertical lift aircraft are limited in their ability to further explore an area of interest or prosecute a target identified at a distance. Because of their limited fuel capacity, a conventional vertical lift aircraft may only remain airborne for a short period of time, limiting its effective ability to travel to an area of interest, explore further, and then return to a safe landing location. The slow speed of a lighter-than-air device renders them ineffectual at close exploration, as most often a target of interest will have moved or changed significantly in the time a lighter-than-air device would take to transit to the region.

BRIEF DESCRIPTION OF THE INVENTION

According to one embodiment of the invention, an electrically powered vertical takeoff and landing aircraft configured for use with a tether station having a continuous power source is provided including at least one rotor system. The vertical takeoff and landing aircraft additionally has an autonomous flight control system coupled to the continuous power source. The autonomous flight control system is configured to operate an electrical motor coupled to the at least one rotor system such that the vertical takeoff and landing aircraft continuously hovers above the tether station in a relative position. The vertical takeoff and landing aircraft also includes a detection system for detecting objects at a distance from the vertical takeoff and landing aircraft.

According to another embodiment of the invention, a sensing and detection system is provided including a tether station and a continuous power source stored within or near the tether station. A cable is wound around a reel mounted to a portion of the tether station. The cable is movable between a retracted, wound position and an extended, unwound position. An electrically powered vertical takeoff and landing aircraft has a detection system coupled to an autonomous flight control system. The vertical takeoff and landing aircraft is configured to continuously hover above a portion of the tether station in a relative position. A first end of the cable is connected to the continuous power source and a second end of the cable is connected to the flight control system such that power is continually supplied thereto.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
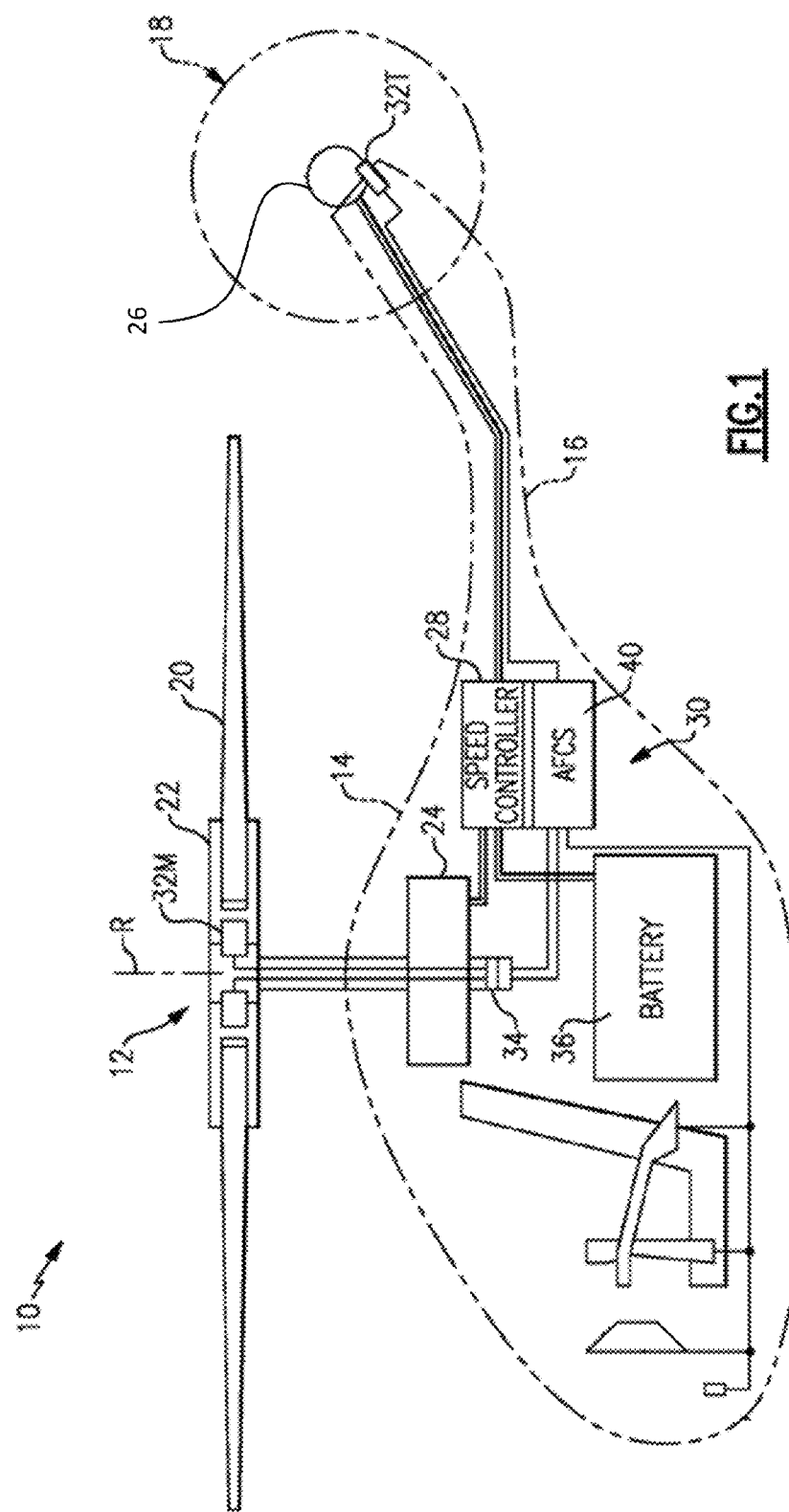
FIG. 1 is a general side view of an exemplary vertical takeoff and landing aircraft for use with an embodiment of the present invention.

A vertical takeoff and landing (VTOL) aircraft, such as a rotary wing aircraft for example, is a heavier-than-air flying machine that generates lift using a plurality of rotor blades that revolve around a shaft. Exemplary VTOL aircraft include, but are not limited to, helicopters, cyclocopters, autogyros, gyrodones, and rotor kites for example. Referring now to FIG. 1, an exemplary electrically powered VTOL aircraft 10 is illustrated. The VTOL aircraft 10 includes a main rotor system 12 supported by an airframe 14 having an extending tail 16 which mounts an anti-torque system 18, such as a tail rotor system for example. The main rotor system 12 includes multiple rotor blades 20 mounted to a rotor hub 22 for rotation about an axis R. Although a particular VTOL aircraft 10 configuration is schematically illustrated in the disclosed, non-limiting embodiments other configurations and/or machines, such as unmanned air vehicles, high speed compound rotary wing aircraft with supplemental translational thrust systems, dual contra-rotating, coaxial rotor system aircraft, tilt rotors and tilt-wing aircraft in either manned or unmanned configurations are within the scope of this invention.

In one embodiment, the main rotor system 12 is driven about the axis of rotation R using an electric motor 24. The electric motor 24 may directly drive the main rotor system 12 without a main rotor gearbox and may in one non-limiting embodiment, be an overrunning electric motor having an overrunning clutch that disengages when the rotor system 12 rotates faster than the electric motor 24. A secondary electric motor 26 may be positioned within the extending tail 16 and configured to drive the anti-torque system 18. In an alternative embodiment, a single electric motor may be configured to drive both the main rotor system 12 and the anti-torque system 18. The electric motors 24, 26 are controlled by an electronic speed controller 28 over a wide range of speeds in response to a flight control system 30. A slip ring system 34 may be connected to the rotor section of motor 24.

An electromechanical servo system may include a main rotor servo system 32M mounted within the rotor hub 22 and an anti-torque servo system 32T positioned within the extending tail 16. The main rotor servo system 32M is configured to pitch each rotor blade 20 individually. The electromechanical servo system 32 is powered by the vehicle management/power/flight control system 30. The flight control system 30 generally includes an automatic flight control system (AFCS) 40 in communication with other avionics systems and components such as the electronic speed controller 28 for example. Power for the electric motors 24, 26 and the electromechanical actuators may be supplied by an on-board power source 36, such as a battery for example. Alternatively, power for the electric motors 24, 26 may be supplied from an external power source coupled to the VTOL aircraft 10. In yet another embodiment, power for the electric motors 24, 26 may be supplied from a combination of an on-board power source 36 and an external power source coupled to the rotary wing aircraft 10. In one embodiment, the VTOL aircraft 10 includes a detection system 42 (FIG. 3), such as an over-the-horizon radar system, sonar system, or electro-optical sensor for example, for detecting objects at a distance from the VTOL aircraft 10. The detection system 42 is operably coupled to the vehicle management/power/flight control system 30 such that a portion of the power applied to the control system 30 is used to operate the detection system 42.

Figure 2:
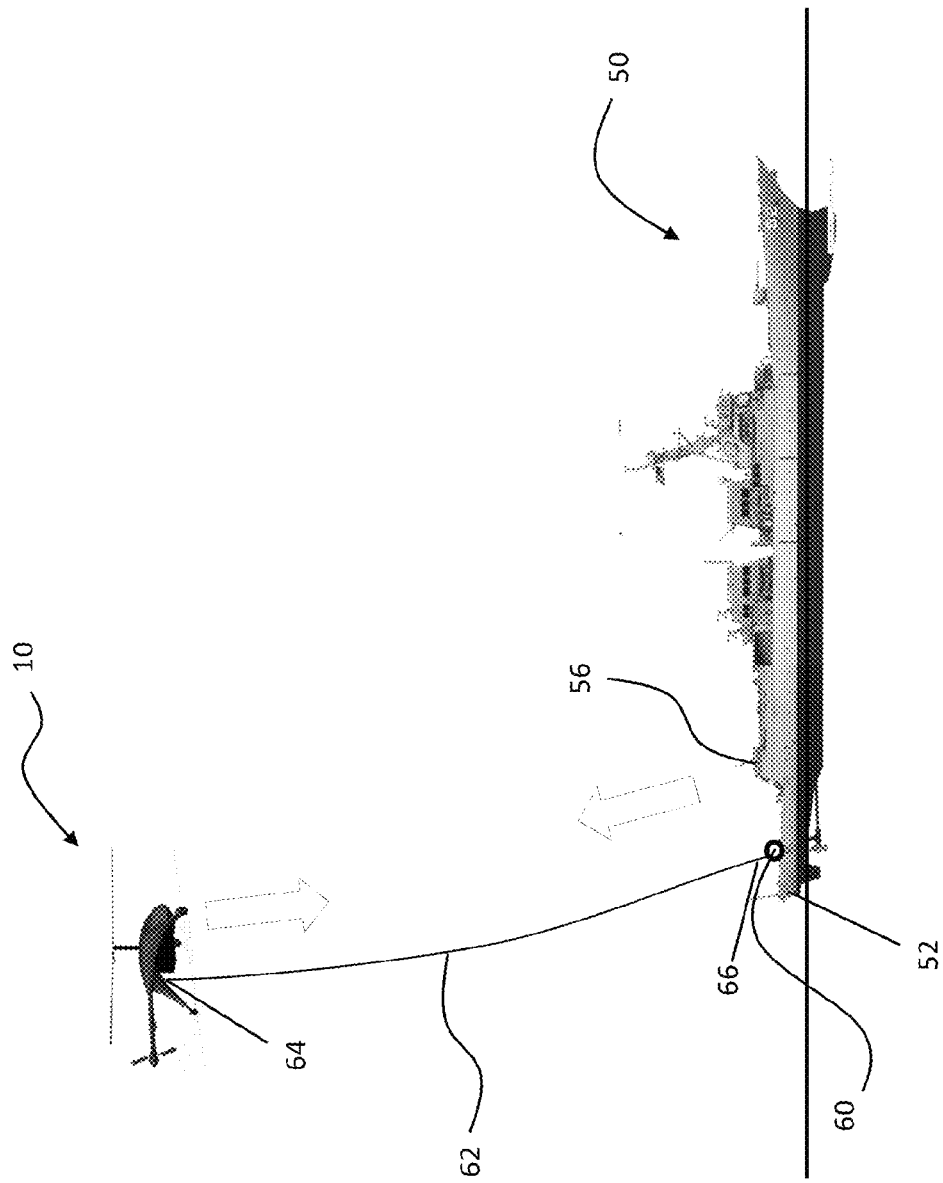
FIG. 2 depicts a sensing system according to an embodiment of the present invention.

Referring now to FIG. 2, a slow moving or stationary tether station 50, such as a ship for example, includes a rotatable reel 60 mounted adjacent an aircraft storage facility, such as a hanger 56, for example near an aft end 52 of the tether station 50. Housed within the reel 60 is a cable 62 movable between a retracted position where the cable 62 is wound around the reel 60 and an extended, unwound position. The length of cable 62 unwound from the reel 60 is controlled by the rotation of the reel 60. A first end 64 of the cable 62 is removably connected to a portion of the VTOL aircraft 10 and a second end 66 of the cable 62 is coupled to a power source 54 on the tether station 50 (FIG. 3), such as a generator for example. In one non-limiting embodiment, the rotary wing aircraft 10 communicates with the reel 60, such that the reel 60 automatically rotates as instructed by the VTOL aircraft 10 so that a desired length of cable 62 is not wrapped around the reel 60. In another embodiment, the reel 60 may bias the cable 62 into the retracted position. Movement of the VTOL aircraft 10 in a direction away from the tether station 50 will pull the necessary length of cable 62 from the reel 60. As the VTOL aircraft 10 moves towards the tether station 50, the cable 62 will automatically retract into the reel 60 to prevent excess slack in the cable 62 between the reel 60 and the VTOL aircraft 10. In another embodiment, the VTOL aircraft 10 has the capability to separate itself from the cable 62 in order to land in an emergency or transit farther than the length of the cable 62 to further explore an identified area of interest.

The cable 62 is configured to provide power to the electrically powered VTOL aircraft 10. If the VTOL aircraft 10 includes an onboard power source 36, the electrical power provided by the cable 62 may be used to partially or wholly charge the onboard power source 36. In one embodiment, the cable 62 additionally includes a wire (not shown) configured to transmit data between the tether station 50 and the VTOL aircraft 10. Alternatively, the VTOL aircraft 10 may be configured to wirelessly transmit and receive data to and from the tether station 50.

Figure 3:
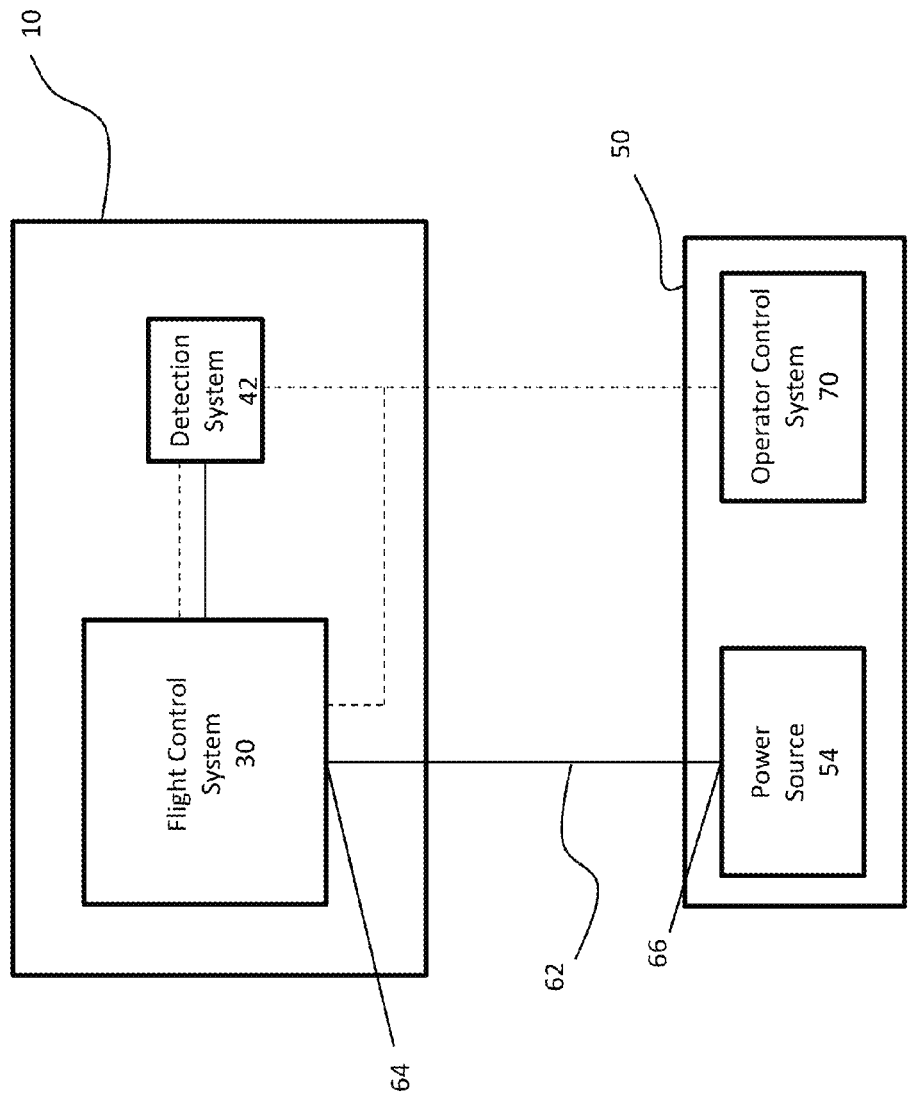
FIG. 3 is a schematic illustration of a portion of the sensing system according to an embodiment of the present invention.

The connected tether station 50 and VTOL aircraft 10 are illustrated schematically in FIG. 3. As shown, the tether station 50 includes an operator control system 70 configured to communicate with the flight control system 30 and the coupled detection system 42 of the VTOL aircraft 10. Information collected by the detection system 42 about the presence of any objects in the distance is transmitted to the operator control system 70 of the tether station 50. Though the flight control system 30 may be autonomous, the operator control system 70 is configured such that an operator either directly at the tether station 50 or remotely connected to the tether station 50 may selectively control the flight control system 30, and therefore the VTOL aircraft 10 if desired.

Because power is constantly generated by the power source 54 on or near the tether station 50, the VTOL vertical flight aircraft 10 is configured to continuously hover at a position generally vertically above the tether station 50. The autonomous flight control system 30 is configured to maintain the VTOL aircraft 10 in substantially the same hovered position relative to the tether station 50, for example above the aft end 52, as the tether station 50 moves. The VTOL aircraft 10 need only be lowered to the hanger 56 on or near the tether station 50 in an emergency or when the VTOL aircraft 10 experiences a mechanical or electrical failure and maintenance is required. In the event of emergency, to quickly land the VTOL aircraft 10 on the tether station 50, the cable 62 connecting the VTOL aircraft 10 and the tether station 50 may be severed. Similarly, an operator at the tether station 50 or remotely connected thereto may instruct the VTOL aircraft 10 through the autonomous flight control system 30 to disconnect itself from the cable 62 and proceed to a position away from the tether station 50. The autonomous flight control system 30 may be configured to monitor the condition of the onboard power 36 such that the operator or the autonomous flight control system 30 returns the VTOL aircraft 10 to the hanger 56 before the onboard power source 36 is exhausted.

In one embodiment, the autonomous flight control system 30 includes situation awareness which correlates all information available to the system 30, including information provided to the system 30 by the operator control system 70 of the tether station 50, to derive a cognitive understanding of the operational environment. The flight control system 30 is configured to detect changes in operational environment, such as weather or system anomalies for example, and alter its position relative to the tether station 50 accordingly. Alternatively, the flight control system 30 may include a navigation or coordinate positioning system. In such embodiments, the autonomous flight control system 30 is configured to retain a given coordinate position relative to the tether station 50. The methods described herein for maintaining the position of the rotary wing aircraft relative to the vessel are exemplary, and other known methods of autonomous flight control are within the scope of the invention.

The VTOL aircraft 10 is more robust than conventional lighter-than-air devices used to improve the sensing capability of a tether station 50, such as a vessel or stationary ground location. Unlike lighter-than-air devices, the VTOL aircraft 10 is easier to maintain and may be stored in the hanger 56 of the tether station 50 if necessary. By performing maintenance on the VTOL aircraft 10 as needed, the VTOL aircraft 10 may be used repeatedly for extended amounts of time and may be deployed and retracted faster and more efficiently. The VTOL aircraft 10 is more resistant to inclement weather than a lighter-than-air device. In addition, due to the speed of the VTOL aircraft 10, it has the capability to travel and more closely inspect areas of interest in an operationally relevant time period than the lighter-than-air device. Supplying power to the VTOL aircraft 10 from a power source 54 on or near the tether station 50, allows the VTOL aircraft 10 to continuously hover at a distance above the tether station 50. When the VTOL aircraft 10 is hovering vertically above the tether station 50, the sensing range of the detection system 42 is significantly improved compared to the range of a conventional antenna or a mast mounted sensing system on or near the tether station 50.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electrically powered vertical takeoff and landing aircraft configured for use with a movable tether station having a continuous power source, comprising:
   at least one rotor system;
   an autonomous flight control system coupled to the continuous power source, the autonomous flight control system being configured to operate an electrical motor coupled to the at least one rotor system such that the vertical takeoff and landing aircraft continuously hovers above the tether station in a relative position as the tether station moves; and
   a detection system for detecting objects at a distance from the vertical takeoff and landing aircraft.

2. The electrically powered vertical takeoff and landing aircraft according to claim 1, wherein the autonomous flight control system uses situation awareness to maintain the relative position of the rotary wing aircraft.

3. The electrically powered vertical takeoff and landing aircraft according to claim 1, wherein the autonomous flight control system uses a positioning system to maintain the relative position of the vertical takeoff and landing aircraft.

4. The electrically powered vertical takeoff and landing aircraft according to claim 1, wherein the vertical takeoff and landing aircraft includes an onboard power storage source charged with power supplied by the continuous power source.

5. The electrically powered vertical takeoff and landing aircraft according to claim 4, wherein the flight control system includes a transmitter and a receiver for communicating with the movable tether station.

6. The electrically powered vertical takeoff and landing aircraft according to claim 1, wherein a cable operably couples the flight control system of the vertical takeoff and landing aircraft to the continuous power source.

7. The electrically powered vertical takeoff and landing aircraft according to claim 6, wherein the cable may be remotely disconnected from the flight control system.

8. A sensing and detection system comprising:
   a movable tether station;
   a continuous power source stored within or near the tether station;
   a cable wound around a reel mounted to a portion of the tether station, the cable being movable between a retracted, wound position and an extended, unwound position; and
   an electrically powered vertical takeoff and landing aircraft having a detection system coupled to an autonomous flight control system such that the vertical takeoff and landing aircraft is configured to continuously hover above a portion of the tether station in a relative position as the tether station moves, wherein a first end of the cable is connected to the continuous power source and the second end of the cable is coupled to the flight control system such that power is continually supplied thereto.

9. The sensing and detection system according to claim 8, wherein the movable tether station includes an operator control system operably coupled to the detection system and the flight control system of the vertical takeoff and landing aircraft.

10. The sensing and detection system according to claim 9, wherein the operator control system is configured to selectively remotely control the flight control system.

11. The sensing and detection system according to claim 9, wherein information collected by the detection system of the vertical takeoff and landing aircraft is transmitted to the operator control system.

12. The sensing and detection system according to claim 9, wherein the flight control system includes a wireless transmitter and receiver for communicating with the operator control system.

13. The sensing and detection system according to claim 8, wherein the cable includes a wire such that data is transmitted through the wire between the movable tether station and the vertical takeoff and landing aircraft.

14. The sensing and detection system according to claim 8, wherein the reel is configured to move the cable between a first position and a second position in response to communication from the flight control system.

15. The sensing and detection system according to claim 8, wherein the continuous power source is a generator.

16. The sensing and detection system according to claim 8, wherein the autonomous flight control system uses situation awareness to maintain the relative position of the vertical takeoff and landing aircraft.

17. The sensing and detection system according to claim 8, wherein the autonomous flight control system uses a positioning system to maintain the relative position of the vertical takeoff and landing aircraft.

18. The sensing and detection system according to claim 8, wherein the detection system of the vertical takeoff and landing aircraft is an over-the-horizon radar system.

19. The sensing and detection system according to claim 8, wherein the detection system of the vertical takeoff and landing aircraft is an electro-optical sensor.

\* \* \* \* \*